L. B. TIERNON AND P. J. KAMUF.
SAW SET.
APPLICATION FILED SEPT. 22, 1919.
1,361,927.
Patented Dec. 14, 1920.
3 SHEETS—SHEET 1.
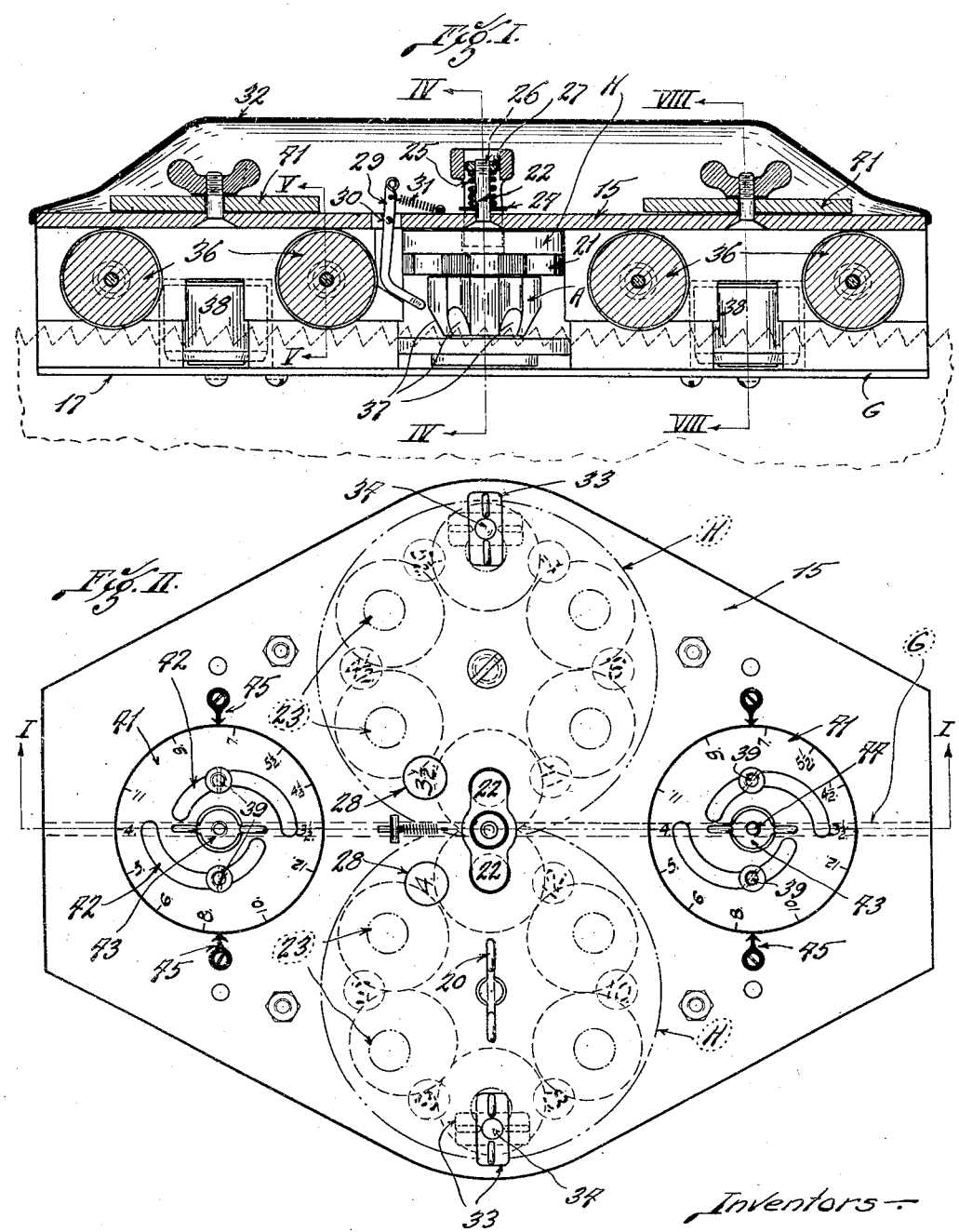
Inventors—
L. B. Tiernon
P. J. Kamuf
by
Knight & Cook, attys.

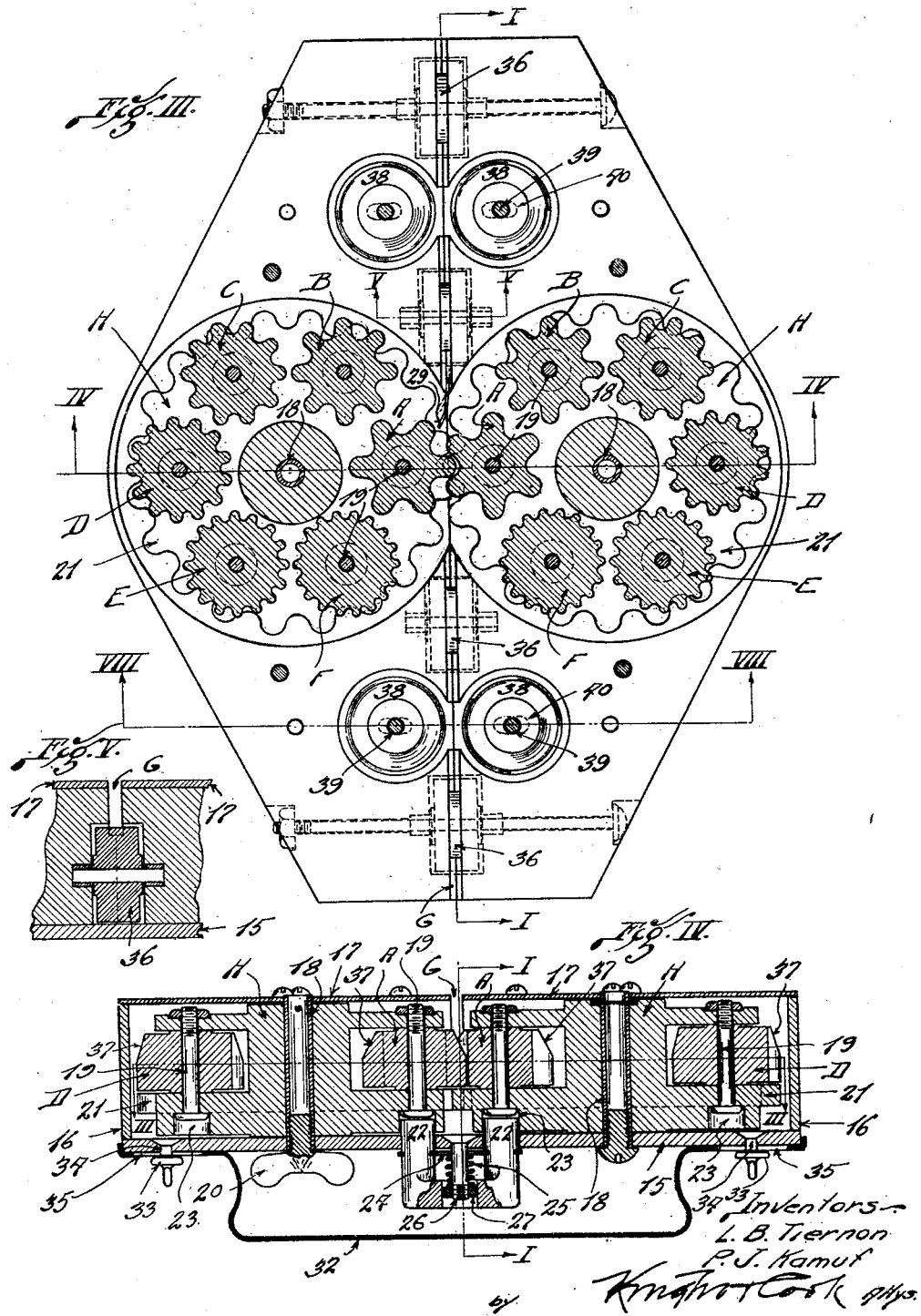

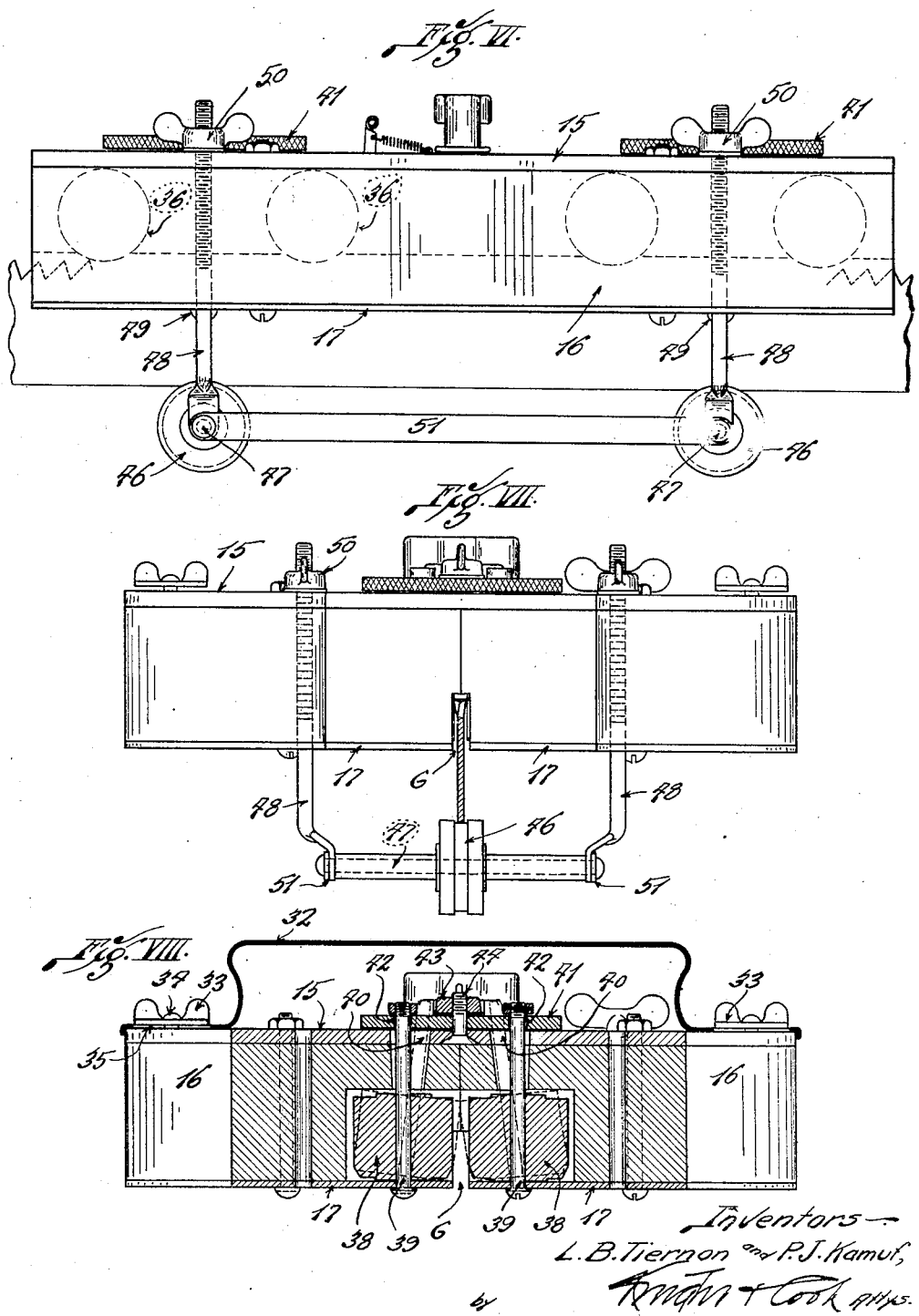

UNITED STATES PATENT OFFICE.

LUKE B. TIERNON, OF PINE LAWN, AND PETER J. KAMUF, OF WELLSTON, MISSOURI.

SAW-SET.

1,361,927.

Specification of Letters Patent.

Patented Dec. 14, 1920.

Application filed September 22, 1919. Serial No. 325,567.

*To all whom it may concern:*

Be it known that we, LUKE B. TIERNON and PETER J. KAMUF, citizens of the United States of America, and residents of Pine Lawn, in the county of St. Louis, State of Missouri, and Wellston, in the county of St. Louis, State of Missouri, respectively, have invented certain new and useful Improvements in Saw-Sets, of which the following is a full, clear, and exact description, reference being had to the accompanying drawings, forming part of this specification.

Our invention relates to improvements in saw sets, one of the objects being to provide a simple and efficient device whereby saw teeth can be easily and quickly set by merely moving the saw, or the saw set, in a direction longitudinal of the saw blade. This is preferably accomplished by the use of rotatable setting members, or bending members, having teeth which act upon the saw teeth. To retain the bending members in operative relation to the saw, the teeth on said bending members are adapted to mesh with the saw teeth. These toothed bending members are also in mesh with each other, so as to retain their bending teeth in certain relative positions wherein they act upon the alternating saw teeth. To enable the toothed bending members to mesh with each other and also with the saw teeth, said bending members are preferably relatively small in diameter at the points where they engage and mesh with the saw teeth.

Another object is to enable the saw set to act upon saw teeth of different dimensions. For this purpose the device preferably comprises pairs of bending members adapted to act upon saws having different spaces between the teeth, or differing in the number of teeth to an inch. The bending members of each pair are arranged at opposite sides of the saw, and they are carried by holders which may be adjusted to locate the bending members of any selected pair in operative relation to each other.

A further object is to provide means whereby the saw teeth may be adjusted after they have been acted upon by the bending device.

With the foregoing and other objects in view, the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a longitudinal section taken on the lines I—I, in Figs. II, III and IV.

Fig. II is a top or plan view of the device with the cover removed.

Fig. III is a horizontal section taken approximately on the line III—III, Fig. IV.

Fig. IV is a transverse section taken on the lines IV—IV, in Figs. I and III, the device being shown in an inverted position.

Fig. V is a fragmentary section taken approximately on the lines V—V in Figs. I and III, showing one of the guide rolls.

Fig. VI is a side elevation illustrating the device applied to a band saw.

Fig. VII is an end view of the structure shown in Fig. VI.

Fig. VIII is a transverse section on the lines VIII—VIII in Figs. I and III, showing a pair of the bending rolls, or gage rolls, whereby the saw teeth may be adjusted after they have been acted upon by the toothed members of the setting device.

The various rotatable bending elements are preferably inclosed in a housing having a top wall 15, side walls 16, and bottom wall members 17, the latter being separated from each other at the longitudinal center line of the housing, to provide a guideway G for the toothed margin of the saw. Large circular holders H are located in the housing and secured to rotatable shafts 18 (Figs. III and IV) at opposite sides of the longitudinal guideway G. Toothed bending wheels A, B, C, D, E and F are loosely mounted on shafts 19 carried by the rotatable holders H. When these holders occupy the positions shown in the drawings the rotatable bending wheels A mesh with each other, and the wheels of this pair lie at opposite sides of the guideway G, so as to act upon the saw teeth, as will be hereinafter described.

By referring to Fig. III it will be seen that there are six pairs of the toothed bending wheels designated A to F, inclusive, and that the holders H are positioned to locate the pair of wheels A in operative relation to each other. The companion wheels of each pair are provided with teeth of the same pitch, but the several pairs of wheels differ from each other, the object being to enable the device to be used in setting the teeth of saws which differ in the number of teeth to one inch. The means for adjusting the rotatable holders H comprises an operating member 20 on the hollow shaft 18 (Fig. IV), to which one of the holders is secured, and gear wheels 21 (Figs. III and IV) whereby rotary movement is transmitted from one holder to the other. These gear wheels may be formed integral with the respective holders, and they mesh with each other to prevent independent rotation of the holders. By using gearing in this manner we prevent disarrangement of the pairs of wheels A to F, and enable the companion wheels of any selected pair to be easily brought into coöperative relation with each other. After the rotary holders have been adjusted they are locked to retain the selected pair of bending wheels in their operative positions. The locking means comprises a double locking bolt having fingers 22 (Figs. I, II and IV), adapted to enter recesses 23 formed in the holders H, a spring seat 24 (Fig. IV) in the form of a bridge fixed to the fingers 22, and a spring 25 acting on said spring seat to yieldingly force the fingers into the recesses 23. A stud 26, secured to the housing wall 15, is provided with a nut 27 forming a seat for the outer end of the spring 25.

To indicate the locations of the bending wheels which are concealed in the housing, the top faces of the holders H may be provided with indicating numerals, as shown by dotted lines in Fig. II, and the top wall of the housing may be provided with sight openings 28 adapted to register with the indicating numerals. These numerals are based upon numbers of saw teeth to the inch, and the numerals appearing at the sight openings 28 refer to the bending wheels which are positioned to engage the saw. For example, when the rotary holders H are adjusted to the positions shown in the drawings, the bending wheels A will coöperate with each other, and the numerals 3½ and 4 appear at the sight openings 28, the bending wheels A being adapted to act upon saws having 3½ or 4 teeth to the inch.

When the adjustable holders H are turned on their axes, the several pairs of toothed bending wheels will be successively brought into mesh at the longitudinal center line of the device, and it will occasionally be necessary to turn one of the toothed bending wheels a slight distance, so as to enable it to properly mesh with its companion wheel. For this reason, a shifter 29 (Figs. I and III), in the form of a lever, is pivotally supported at 30, the inner end of said lever being adapted to engage and shift a toothed bending wheel when the latter fails to mesh with its companion wheel, and the outer end of said lever 29 being exposed above the top wall 15 where it can be conveniently manipulated. 31 designates a spring (Fig. I) whereby the inner end of the shifter lever 29 is yieldingly held in an ineffective position beyond the paths of the toothed bending wheels.

A cover 32 (Figs. I, IV and VIII), arranged over the top wall 15 of the housing, is detachably secured by means of latch members 33, pivoted at 34 and adapted to pass through slots 35 formed in the cover. This cover serves as a handle whereby the device may be grasped when it is in service.

Guide wheels 36 (Figs. I, III and V), preferably made of soft metal, are located at the guideway G, so as to engage the points of the saw teeth, which are shown by dotted lines in Fig. I. These guide wheels 36 are loosely mounted on shafts arranged at a right angle to the axes of the toothed bending wheels. To set a saw it is only necessary to locate the toothed margin of the saw in the guideway G and to move either the saw or the setting device in a direction longitudinal of the saw blade. The active setting wheels, or bending wheels, designated by A in the drawings, mesh with each other and also with the saw teeth. The teeth of each bending wheel are provided with beveled bending faces 37 (Figs. I and IV) adapted to engage the saw teeth, said bending faces being inclined so as to reduce the diameter of the bending wheels at the points where they contact with the saw teeth. The inclined reduced portions of the teeth prevent excessive bending, and enable the bending wheels to very effectively set the saw teeth at the desired angle, while the larger portions of the bending teeth are in mesh to positively retain the active bending wheels in operative relation to each other. The guideway G and the guide rollers 36 coöperate with the saw blade to retain the saw teeth in operative relation to the bending wheels.

The saw teeth may be considered as a long rack bar and the bending wheels may be considered as pinions meshing therewith. The active bending wheels, loosely mounted on their respective shafts, are rotated through the medium of the saw teeth, while the entire setting device is moved longitudinally of the saw blade. It is not necessary for the saw teeth to accurately fit the toothed bending wheels. In fact, as previously suggested, the bending wheels A are adapted to coöperate with saws having either 3½ or 4 teeth to the inch, while the bending wheels F are adapted to act upon saws having either 11 or 12 teeth.

We will now describe the gages whereby the saw teeth may be automatically adjusted, either before or after they have been acted upon by the bending wheels. Pairs of plain bending rolls 38 are located between the bending wheels and the ends of the housing in which all of said wheels are mounted.

The bending rools 38 of each pair are rotatable on shafts 39 (Figs. III and VIII) at opposite sides of the guideway G, so as to engage opposite sides of the toothed edge of the saw. The lower ends of these shafts 39 (Fig. VIII) are loosely fitted to the housing members 17, while the upper ends of said shafts pass through slots 40 in the housing, and said upper ends are acted upon by adjusting cams, as will be hereafter described, to move the oppositely disposed rolls 38 toward and away from each other. If a saw tooth should project too far from the side of the saw blade, the bending rolls 38 will automatically bend it to the proper position. However, the most important function of the gages, or bending rolls 38, lies in their use as a means for reducing the set produced by the toothed bending wheels. These toothed wheels may be combined with each other to obtain the standard "wide set", and if this set is desired, the smooth bending rolls are merely adjusted to act upon teeth which project too far. Before the saw teeth reach the toothed bending wheels, one pair of the plain bending rolls 38 will act upon and restore the saw teeth which have an excessive lateral bend. When a "narrow set" is desired, the bending rolls 38 which follow the toothed bending wheels, will be adjusted to force the saw teeth toward each other after they have been given a "wide set" by the toothed bending wheels. The operator can thus very easily obtain any desired set.

The means for adjusting the plain bending rolls 38 comprises cam disks 41 (Figs. I, II and VIII), provided with cam slots 42 through which the shafts 39 extend. Obviously, these disks can be readily turned to force the rolls 38 toward each other, and after the desired adjustment has been obtained, the disks can be locked by tightening the clamping nuts 43 on the studs 44, which pass through the centers of the respective disks.

To indicate the various adjustments of the bending rolls 38, the rotatable cam disks 41 are provided with indicating characters (Fig. II) adapted to register with stationary pointers 45. These indicating characters may be based upon the various numbers of saw teeth to the inch.

Figs. VI and VII show a manner in which the device can be applied to an endless band saw. Guide rollers 46, mounted on shafts 47, are grooved to receive the plain edge of the band saw. The shafts 46 are mounted in the lower ends of rods 48, which pass through the housing of the setting device, said rods having shoulders 49 which engage the bottom wall of the housing. 50 designates adjustable nuts located on the threaded upper ends of rods 48 to detachably secure them to the housing. The lower ends of rods 48 are preferably connected by means of bars 51.

We claim:

1. A saw set comprising pairs of bending members adapted to set saw teeth of different dimensions, the members of each pair being arranged to lie at opposite sides of the saw, and holders whereby said bending members are supported, said holders being adjustable to locate the bending members of any selected pair in operative relation to each other.

2. A saw set comprising pairs of toothed bending members adapted to set saw teeth of different dimensions, the members of each pair being adapted to mesh with each other and also with the saw teeth when located at opposite sides of the saw, and oppositely disposed holders in which said bending members are mounted, said holders being rotatable to locate the bending members of any selected pair in operative relation to each other.

3. A saw set comprising pairs of toothed bending members adapted to set saw teeth of different dimensions, the members of each pair being adapted to mesh with each other and also with the saw teeth when located at opposite sides of the saw, oppositely disposed holders in which said bending members are mounted, said holders being rotatable to locate the bending members of any selected pair in operative relation to each other, and means for locking said holders in the positions to which they are adjusted.

4. A saw set comprising a support, holders rotatably secured to said support so as to lie at opposite sides of the saw, pairs of rotatable toothed bending members mounted in said holders, the bending members of each pair being adapted to mesh with each other and also with the saw teeth, each of said holders being provided with a series of the bending members adapted to coöperate with the bending members of the other holder, said holders being adjustable about their axes to locate the bending members of any selected pair in operative relation to each other, and means for locking said holders in the positions to which they are adjusted.

5. A saw set comprising pairs of toothed bending members adapted to set saw teeth of different dimensions, the members of each pair being adapted to mesh with each other and also with the saw teeth when located at opposite sides of the saw, oppositely disposed holders in which said bending members are mounted, said holders being rotatable to locate the bending members of any selected pair in operative relation to each other, and gear wheels secured to the respective holders, said gear wheels being in mesh with each other to prevent independent rotation of the holders.

6. A saw set comprising pairs of bending members adapted to set saw teeth of different dimensions, the members of each pair being arranged to lie at opposite sides of the saw, holders whereby said bending members are supported, said holders being adjustable to locate the bending members of any selected pair in operative relation to each other, and indicating means associated with said holders to indicate the location of the selected pair of bending members.

7. A saw set comprising a support, holders rotatably secured to said support so as to lie at opposite sides of the saw, pairs of rotatable toothed bending members mounted in said holders, the bending members of each pair being adapted to mesh with each other and also with the saw teeth, each of said holders being provided with a series of the bending members adapted to coöperate with the bending members of the other holder, said holders being adjustable about their axes to locate the bending members of any selected pair in operative relation to each other, and a shifter whereby one of the selected bending members may be shifted to enable it to mesh with its companion bending member.

8. A saw set comprising a support, holders rotatably secured to said support so as to lie at opposite sides of the saw, pairs of rotatable toothed bending members mounted in said holders, the bending members of each pair being adapted to mesh with each other and also with the saw teeth, each of said holders being provided with a series of the bending members adapted to coöperate with the bending members of the other holder, said holders being adjustable about their axes to locate the bending members of any selected pair in operative relation to each other, and a shifter whereby one of the selected bending members may be shifted to enable it to mesh with its companion bending member, said shifter including a movable finger adapted to engage a tooth on the selected bending member.

9. A saw set comprising means for bending the saw teeth, and a gage whereby the saw teeth are automatically adjusted after they have been acted upon by said bending means.

10. A saw set comprising a support, a bending device secured to said support so as to successively act upon the saw teeth, and a gage secured to said support and separated from said bending device, said gage being in alinement with said bending device and provided with oppositely disposed bending members whereby the saw teeth are acted upon after they are released from said bending device.

11. A saw set comprising a support, a bending device secured to said support so as to successively act upon the saw teeth, and a gage secured to said support and separated from said bending device, said gage comprising a pair of rotatable bending rolls arranged to engage opposite sides of the toothed edge of the saw.

12. A saw set comprising a support, a setting device secured to said support so as to bend successive saw teeth, a gage comprising a pair of bending rolls adapted to engage opposite sides of the toothed edge of the saw, and means for adjusting said bending rolls toward and away from each other.

13. A saw set comprising a support, a setting device secured to said support so as to bend successive saw teeth, a gage comprising a pair of bending rolls adapted to engage opposite sides of the toothed edge of the saw, and means for adjusting said bending rolls toward and away from each other, said adjusting means comprising shafts on which the bending rolls are mounted, a cam coöperating with said shafts to adjust the rolls, and means for securing said cam to retain the bending rolls in the positions to which they are adjusted.

14. A saw set comprising a support, a setting device secured to said support so as to bend successive saw teeth, a gage comprising a pair of bending rolls adapted to engage opposite sides of the toothed edge of the saw, means for adjusting said bending rolls toward and away from each other, and an indicator showing the relative positions of the operative faces of said bending rolls.

In testimony that we claim the foregoing we hereunto affix our signatures.

LUKE B. TIERNON.
PETER J. KAMUF.